US012724366B2

(12) United States Patent
Matsuda

(10) Patent No.: US 12,724,366 B2
(45) Date of Patent: Sep. 1, 2026

(54) FIXING DEVICE AND IMAGE FORMING APPARATUS

(71) Applicant: Ryohei Matsuda, Kanagawa (JP)

(72) Inventor: Ryohei Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 27 days.

(21) Appl. No.: 18/983,426

(22) Filed: Dec. 17, 2024

(65) Prior Publication Data

US 2025/0208548 A1 Jun. 26, 2025

(30) Foreign Application Priority Data

Dec. 25, 2023 (JP) ................................ 2023-217577

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
CPC ........... G03G 15/2017; G03G 15/2039; G03G 15/2042; G03G 15/2053
See application file for complete search history.

(56) References Cited

U.S. PATENT DOCUMENTS 10,496,021 B1 * 12/2019 Furuyama ............ H04N 1/1937
2017/0255147 A1 9/2017 Seki et al.
2018/0011432 A1 1/2018 Yoshinaga et al.
2018/0157198 A1 6/2018 Seto et al.
2018/0284663 A1 10/2018 Matsuda et al.
2018/0356754 A1 12/2018 Yoshinaga et al.
2020/0285180 A1 9/2020 Matsuda et al.
2020/0301331 A1 * 9/2020 Mitsuoka ........... G03G 15/2057
2020/0401068 A1 12/2020 Matsuda et al.
2023/0229104 A1 7/2023 Yamaguchi
2024/0176268 A1 5/2024 Yoshinaga et al.

FOREIGN PATENT DOCUMENTS

JP 2015-102718 A 6/2015
JP 2019-015943 A 1/2019
JP 2020-067465 A 4/2020
JP 2020-134681 A 8/2020
JP 2023-106335 A 8/2023

* cited by examiner

*Primary Examiner* — Thomas S Giampaolo, II
(74) *Attorney, Agent, or Firm* — XSENSUS LLP

(57) ABSTRACT

A fixing device includes a fixing rotator, a heat conductor, a pressure rotator, a heater, a pressure-receiving portion, and a heat insulator. The heat conductor contacts an inner circumferential surface of the fixing rotator to uniform temperature distribution in a rotation axis direction of the fixing rotator. The pressure rotator presses the fixing rotator against the heat conductor to form a nip and presses a recording medium passing through the nip. The heater is disposed inside a loop of the fixing rotator. The pressure-receiving portion contacts the heat conductor to receive pressure from the pressure rotator via the fixing rotator. The heat insulator is between the pressure-receiving portion and the heat conductor and includes a sheet-shaped silica aerogel.

20 Claims, 4 Drawing Sheets

FIXING DEVICE AND IMAGE FORMING APPARATUS

CROSS-REFERENCE TO RELATED APPLICATION

This patent application is based on and claims priority pursuant to 35 U.S.C. § 119 (a) to Japanese Patent Application No. 2023-217577, filed on Dec. 25, 2023, in the Japan Patent Office, the entire disclosure of which is hereby incorporated by reference herein.

BACKGROUND

Technical Field

Embodiments of the present disclosure relate to a fixing device and an image forming apparatus incorporating the fixing device.

Related Art

An electrophotographic image forming apparatus such as a copier or a printer includes a fixing device to fix a toner image onto a recording medium such as a sheet. Various types of fixing devices are used, and a sliding belt type is known as a typical type.

SUMMARY

This specification describes an improved fixing device that includes a fixing rotator, a heat conductor, a pressure rotator, a heater, a pressure-receiving portion, and a heat insulator. The heat conductor contacts an inner circumferential surface of the fixing rotator to uniform temperature distribution in a rotation axis direction of the fixing rotator. The pressure rotator presses the fixing rotator against the heat conductor to form a nip and presses a recording medium passing through the nip. The heater is disposed inside a loop of the fixing rotator. The pressure-receiving portion contacts the heat conductor to receive pressure from the pressure rotator via the fixing rotator. The heat insulator is between the pressure-receiving portion and the heat conductor and includes a sheet-shaped silica aerogel.

This specification also describes an image forming apparatus that includes the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

DETAILED DESCRIPTION

Figure 1:
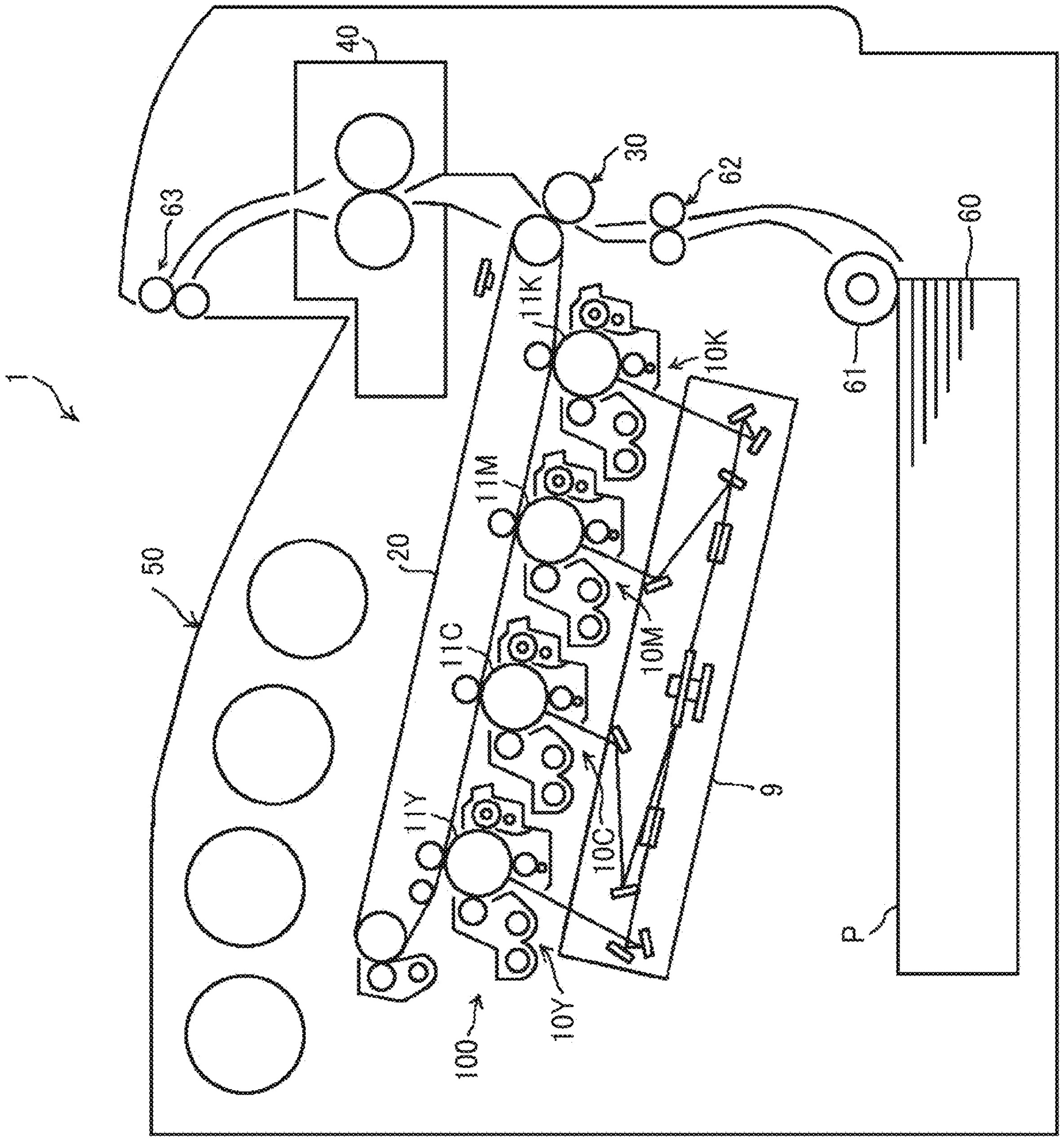
FIG. 1 is a schematic diagram illustrating a configuration of an image forming apparatus according to an embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the drawings, embodiments of the present disclosure are described below. Like reference signs are assigned to identical or equivalent components and a description of those components may be simplified or omitted.

FIG. 1 is a schematic diagram illustrating a configuration of the image forming apparatus according to an embodiment of the present disclosure. A laser printer is described below as an electrophotographic image forming apparatus according to an embodiment of the present disclosure.

The image forming apparatus 1 includes an image forming section 100 to form an image on a sheet P as a recording medium. The image forming apparatus 1 is a tandem-type image forming apparatus. The image forming section 100 includes image forming devices 10Y, 10M, 10C, and 10K for respective colors of yellow (Y), magenta (M), cyan (C), and black (K), an intermediate transfer belt 20 as an intermediate transferor, and an optical writing device 9 as an electrostatic-latent-image forming device. The image forming devices 10Y, 10M, 10C, and 10K are arranged along a rotation direction of the intermediate transfer belt 20 on the intermediate transfer belt 20. The image forming devices 10Y, 10M, 10C, and 10K include photoconductors 11Y, 11M, 11C, and 11K as latent image bearers, respectively.

Each of the image forming devices 10Y, 10M, 10C, and 10K includes a charging device as a charger and a developing device around each of the photoconductors 11Y, 11M, 11C, and 11K. In addition, each of the image forming devices 10Y, 10M, 10C, and 10K includes a primary transfer device as a primary transferor and a cleaning device as a cleaner around each of the photoconductors 11Y, 11M, 11C, and 11K.

The charging device uniformly charges the surface of the photoconductor to a predetermined potential. The optical writing device 9 irradiates the surface of the photoconductor uniformly charged by the charging device with light based on image data to form an electrostatic latent image. The developing devices develop the electrostatic latent images on the photoconductors to form toner images of toners of respective colors (yellow, magenta, cyan, and black), respectively, which is referred to as a developing process. The primary transfer device transfers the toner image on the photoconductor onto the intermediate transfer belt 20. The cleaning device removes residual toner that is not transferred onto the intermediate transfer belt and remains on the photoconductor to clean the surface of the photoconductor.

The respective color toner images formed on the photoconductors 11Y, 11M, 11C, and 11K are primarily transferred to the intermediate transfer belt 20 by the primary transfer devices to overlap each other, thereby forming a full-color toner image on the intermediate transfer belt 20. The full-color toner image on the intermediate transfer belt 20 is conveyed to a region (secondary transfer region) opposite a secondary transfer device 30 as the intermediate transfer belt 20 rotates.

The image forming apparatus includes a sheet tray 60 below the image forming section 100. The sheet tray 60 holds sheets P and serves as a feeding section for feeding the sheet P. A pickup roller 61 feeds the sheets P one by one from the sheet tray 60 to a conveyance path. A registration roller pair 62 conveys the sheet P to the secondary transfer region along the conveyance path.

The registration roller pair 62 conveys the sheet P to the secondary transfer region at a specified timing at which the full-color toner image on the intermediate transfer belt 20 reaches the secondary transfer region, and the secondary transfer device 30 secondarily transfers the full-color toner image from the intermediate transfer belt 20 onto the sheet P. The sheet P on which the full-color toner image is formed is then conveyed to a fixing device 40, and the fixing device 40 applies heat and pressure to the sheet P to fix the full-color toner image onto the sheet P. After the full-color toner image is fixed onto the sheet P, the sheet P is conveyed along the conveyance path, and an output roller pair 63 ejects the sheet P to an output tray 50.

Figure 2:
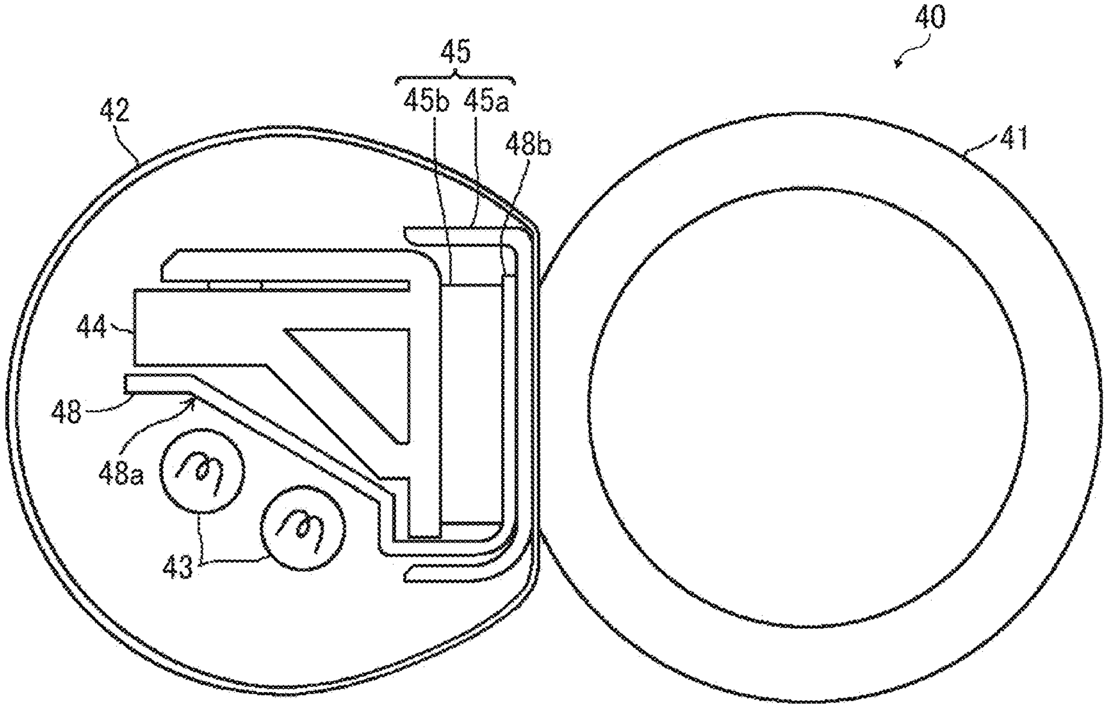
FIG. 2 is a schematic diagram illustrating a configuration of a fixing device in the image forming apparatus of FIG. 1.

FIG. 2 is a schematic diagram illustrating a configuration of the fixing device 40 according to the present embodiment of the present disclosure. The fixing device 40 includes a fixing belt 42 as a fixing rotator, a pressure roller 41 as a pressure rotator, and heaters 43 disposed inside the loop of the fixing belt 42, which apply heat and pressure to the color toner image on the sheet P to fix the color toner image onto the sheet P. In FIG. 2, halogen heaters are illustrated as examples of the heaters 43.

The fixing device 40 includes a stay 44 and a nip formation pad 45 held by the stay 44 that are disposed inside the loop of the fixing belt 42. The nip formation pad 45 sandwiches the fixing belt 42 together with the pressure roller 41 to form a nip.

The nip formation pad 45 includes a heat conductor **45*a* and a resin-pad 45*b*. The heat conductor 45*a* faces a nip face and serves as a heat transferor and a slide. The resin-pad 45*b* supports the heat conductor 45*a*. One of the functions of the resin-pad 45*b* is thermal insulation to reduce heat transferred from the fixing belt 42 to the stay 44 via the nip formation pad 45** and prevent warm-up time and a Typical Electricity Consumption (TEC) value from increasing.

The heat conductor **45*a* has, for example, a pad shape extending in a width direction of the fixing belt 42. The heat conductor 45*a* is disposed to equalize temperature distribution in the fixing belt 42 in a rotation axis direction of the fixing belt 42. The heat conductor 45*a* transfers heat from a high-temperature portion of the fixing belt 42 to a low-temperature portion of the fixing belt 42 to equalize the temperature distribution in the fixing belt 42** in the rotation axis direction.

In FIG. 2, the nip has a flat shape but may have a concave shape or other shapes. The nip having the concave shape causes the direction in which the leading end of the sheet P is ejected from the nip to be the direction toward the pressure roller 41, which enhances separation of the sheet P from the fixing belt 42 and prevents the occurrence of a sheet jam.

The heat conductor **45*a* is made of metal such as aluminum or copper and has a high thermal conductivity of 50 [W/m·K] or more, and the surface of the heat conductor 45*a*** is coated with a coating having an excellent sliding property. Examples of the material for the coating include resin-based materials such as polyimide resin, fluororesin, polyphenylene sulfide resin, and saturated polyester resin. The above-described resin-based coating material may be mixed with glass fiber, carbon, graphite, graphite fluoride, carbon fiber, molybdenum disulfide, and fluororesin.

Alternatively, metal-based coating material may be used. Examples of the metal-based coating materials include molybdenum disulfide, nickel, and composite plating of nickel and fluorine resin. In addition, the metal-based coating material may be anodized aluminum or anodized aluminum impregnated with resin or metal. Ceramics may also be used as the coating material. Examples of the ceramic used as the coating material include silicon carbide ceramic, silicon nitride ceramic, alumina ceramic, and mixtures thereof with molybdenum disulfide or fluorine resin.

Alternatively, forming an anodized aluminum layer on the surface layer of the heat conductor **45*a*** made of aluminum or aluminum alloys and filling the fine pores of the anodized aluminum layer with molybdenum disulfide generated by secondary electrolysis from the deepest portions of the fine pores to the outermost surface layer forms the excellent coating.

The heat conductor **45*a* having a high thermal conductivity in the present embodiment is made of a material having a thermal conductivity equal to or higher than the thermal conductivity of aluminum and is processed as described above. Thus, the heat conductor 45*a*** having a high thermal conductivity is produced.

The pressure roller 41 is in contact with the outer circumferential surface of the fixing belt 42 to form the nip and applies pressure to the recording medium passing through the nip. The pressure roller 41 includes a metal roller, a silicone rubber layer on the outer in circumferential face of the metal roller, and a release layer on the outer circumferential face of the silicone layer. The release layer is made of perfluoroalkoxy alkane (PFA) or polytetrafluoroethylene (PTFE) to obtain releasability. A spring presses the pressure roller 41 against the fixing belt 42 to deform the silicone rubber layer. As a result, the nip has a predetermined nip width.

A driver such as a motor is disposed in the image forming apparatus 1 and transmits driving force to the pressure roller 41 through gears to rotate the pressure roller 41. The pressure roller 41 transmits the driving force to the fixing belt 42 at the nip to rotate the fixing belt 42.

The pressure roller 41 may be a solid roller but is preferably hollow because the hollow roller has a small thermal capacity. The pressure roller 41 may include a heater such as the halogen heater. The silicone rubber layer of the pressure roller 41 may be made of solid rubber. Alternatively, if no heater is situated inside the pressure roller 41, the silicone rubber layer of the pressure roller 41 may be made of sponge rubber. The sponge rubber enhances the thermal insulation of the pressure roller 41, preferably causing the pressure roller 41 to draw less heat from the fixing belt 42.

The fixing belt 42 is an endless belt or film and includes a base layer made of metal such as nickel or steel use stainless (SUS) or resin such as polyimide. The surface layer of the fixing belt 42 has a release layer. The release layer is made of PFA or PTFE to facilitate the separation of toner of the toner image on the sheet P from the fixing belt 42, thus preventing the toner of the toner image from adhering to the fixing belt 42.

An elastic layer made of, e.g., silicone rubber may be interposed between the base layer and the release layer in the fixing belt 42. Omitting the elastic layer made of silicone rubber reduces thermal capacity and enhances a fixing performance. However, the slight surface roughness of the fixing belt 42 may be transferred onto the toner image while the toner image is pressed and fixed onto the recording medium, causing an orange-peel image, which is an image having uneven gloss in a solid part of the image. To prevent the uneven gloss or the orange peel image, the elastic layer made of silicone rubber has a thickness of 100 μm or more. Deformation of the elastic layer made of silicone rubber absorbs the slight surface roughness of the fixing belt 42, preventing the formation of the orange-peel image.

The stay 44 has a hollow pipe-shaped metal body made of metal such as aluminum, iron, or stainless steel. In the present embodiment, a cross-sectional shape of the stay 44 has right angles but may have another cross-sectional shape. The stay 44 prevents bending of the nip formation pad 45 that receives pressure from the pressure roller 41 and uniformly forms the nip width in the axial direction of the pressure roller 41.

Two heaters 43 are disposed inside the loop of the fixing belt 42 to raise the temperature of the fixing belt 42. The heaters 43 in the present embodiment are halogen heaters and directly heat the inner circumferential surface of the fixing belt 42 with radiant heat. As long as the heater 43 can heat the fixing belt 42, the heater 43 may be one of various types of heaters such as a heater including an induction heating (IH) coil, a resistive heat generator, or a carbon heater.

The fixing device 40 includes a reflector 48 inside the loop of the fixing belt 42. The reflector 48 reflects the radiant heat from the heater 43 to the fixing belt 42 to reduce the loss of the radiant heat. The reflector 48 is made of a high-luminance aluminum, which includes a base made of a high-purity aluminum material as a metal member to obtain a high reflectance, for example, a reflectivity of 95% or more. The base has a surface layer including a plurality of reflection-enhancing films and protective films. Depending on the configuration, silver may be deposited on an aluminum plate by vapor deposition to further increase the reflectance.

The reflectance of the reflector 48 in the present embodiment is measured using the spectrophotometer that is the ultraviolet visible infrared spectrophotometer UH4150 manufactured by Hitachi High-Technologies Corporation in which the incident angle is set to 5°.

The reflector 48 according to the present embodiment includes a reflecting portion 48*a* and a pressure-receiving portion 48*b*. The reflecting portion 48*a* reflects the radiant heat toward the inner circumferential surface of the fixing belt 42. The pressure-receiving portion 48*b* receives the pressure from the pressure roller 41. The reflecting portion 48*a* is disposed between the heater 43 and the stay 44. The pressure-receiving portion 48*b* is interposed between the heat conductor 45*a* as the slide and the resin-pad 45*b*.

Figure 3:
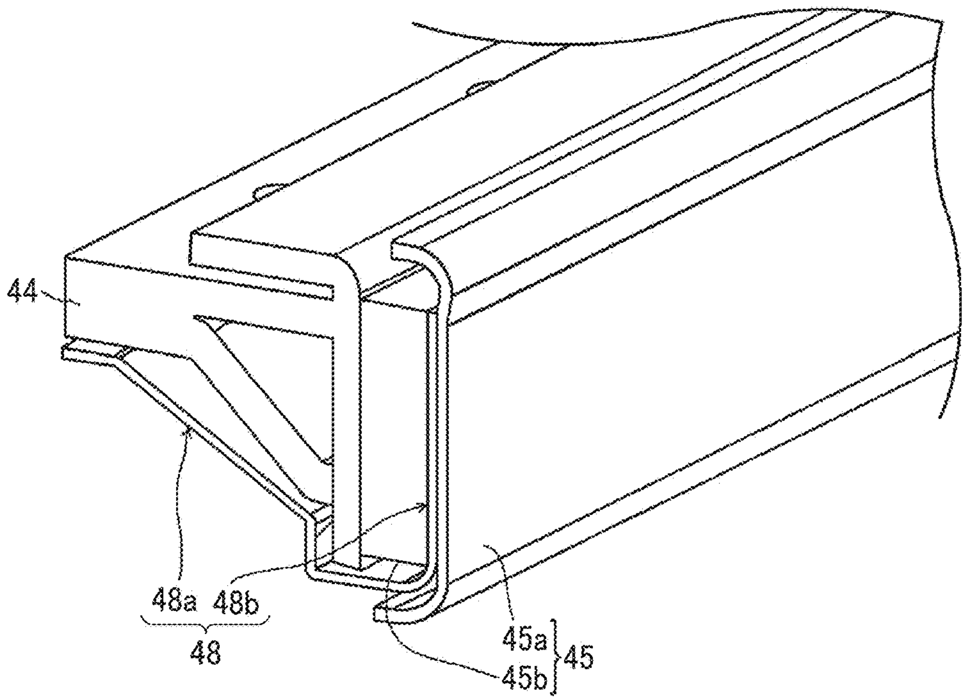
FIG. 3 is a perspective view of a part of the fixing device of FIG. 2 including a reflector, a nip formation pad, and a stay.

FIG. 3 is a perspective view of a part of the fixing device of FIG. 2 including the reflector, the nip formation pad, and the stay. As illustrated in FIG. 3, the pressure-receiving portion 48*b* of the reflector 48 is held by being sandwiched between the heat conductor 45*a* and the resin-pad 45*b*, and a portion other than the pressure-receiving portion 48*b* in the reflector 48 is not in contact with a member around the reflector 48.

The reflector 48 includes the pressure-receiving portion 48*b* extending to a region between the heat conductor 45*a* and the resin-pad 45*b*, and the region receives the pressure from the pressure roller 41. The reflector 48 made of metal having good thermal conductivity such as aluminum quickly transfers heat absorbed in the reflecting portion 48*a* to the entire reflector 48. In other words, the reflecting portion 48*a* is connected to the pressure-receiving portion 48*b* to transfer heat from the reflecting portion 48*a* to the pressure-receiving portion 48*b*.

The heat transferred to the pressure-receiving portion 48*b* transfers to the heat conductor 45*a* in contact with the pressure-receiving portion 48*b*, and as a result, the temperature rise of the reflector 48 can be reduced. The heat transferred to the heat conductor 45*a* is subsequently transferred to the fixing belt 42 and used for melting the toner.

The above-described configuration can more effectively use the heat of the reflector 48 than a configuration in which another member such as the stay 44 dissipates the heat of the reflector 48. As a result, the above-described configuration can shorten a lighting time of the heater 43 and reduce power consumption.

The pressure-receiving portion 48*b* is located in a pressure region that receives the pressure from the pressure roller 41. The pressure causes the heat conductor 45*a* to be in close contact with the pressure-receiving portion 48*b* to enhance heat transfer performance. As a result, the pressure-receiving portion 48*b* can effectively dissipate the heat of the reflector 48. In addition, the heat conductor 45*a* and the reflector 48 made of metal having good thermal conductivity can effectively dissipate the heat of the reflector 48 to the fixing belt 42.

As illustrated in FIGS. 2 and 3, a clearance is formed between the stay 44 and the bent portion of the heat conductor 45*a*. As a result, the stay 44 is not in contact with the bent portion of the heat conductor 45*a*. This can prevent heat transfer from the reflector 48 to the stay 44 via the heat conductor 45*a*.

The above-described structure enables the fixing device to prevent the temperature increase in the reflector 48, effectively using the heat of the reflector 48 to melt the toner and achieve energy saving.

Since the heat conductor 45*a* is coated with the above-described coating having the excellent sliding property, the friction coefficient of the heat conductor 45*a* with respect to the inner circumferential surface of the fixing belt 42 is smaller than the friction coefficient of the surface of the pressure-receiving portion 48*b* with respect to the inner circumferential face of the fixing belt 42.

Thus, the sliding resistance of the fixing belt 42 can be reduced as compared with a case in which the pressure-receiving portion 48*b* of the reflector 48 is brought into contact with the inner circumferential face of the fixing belt 42 to dissipate the heat of the reflector 48 to the fixing belt 42 without passing through the heat conductor 45*a*. The above-described structure prevents an increase in torque for rotating the fixing belt 42 and abrasion of the inner circumferential face of the fixing belt 42.

If the pressure-receiving portion 48*b* of the reflector 48 is coated with the coating having the excellent sliding property to be in contact with the inner circumferential surface of the fixing belt 42, the following disadvantage may be expected.

If the coating material having the excellent sliding property adheres to the reflecting portion 48*a* of the reflector 48, the reflectance of the reflecting portion 48*a* may decrease.

To avoid adhesion of the coating material having the excellent sliding property to the reflecting portion 48*a*, for example, it is necessary to apply masking to the reflecting portion 48*a*. Applying the masking to the reflecting portion 48*a* needs processes such as a process to apply the masking, a process to remove the masking, and a process to remove an adhesive for masking adhered to the reflecting portion 48*a*. It is very difficult for a machine to perform these processes. If the machine that performs these processes can be made, the machine will be expensive.

In contrast, transmitting the heat of the reflector 48 to the fixing belt 42 via the heat conductor 45*a* as described in the present embodiment does not need the excellent slidability of the reflector 48 with respect to the inner circumferential surface of the fixing belt 42. Accordingly, it is not necessary to apply the coating having the excellent sliding property to the pressure-receiving portion 48*b*, which prevents manufacturing difficulty and an increase in cost.

The heat conductor 45*a* is disposed between the pressure-receiving portion 48*b* of the reflector 48 and the fixing belt 42. However, a member disposed between the pressure-receiving portion 48*b* and the fixing belt 42 may be a member having a better sliding property with respect to the inner circumferential surface of the fixing belt 42 than the pressure-receiving portion 48*b*.

For example, although a property to dissipate the heat to the fixing belt 42 is inferior to a property of the heat conductor 45*a*, a sliding sheet as the sliding member may be disposed between the pressure-receiving portion 48*b* and the fixing belt 42. The sliding sheet is made of fibers such as PTFE impregnated with a lubricant such as silicone oil. The sliding sheet is, for example, disposed so as to be wound around the resin-pad 45*b* and fixed by a screw on a back side of the resin-pad 45*b*, the back side facing the stay 44.

A description is given below of a characteristic configuration according to the present embodiment of the present disclosure.

The reflector 48 contacting the heat conductor 45*a* as described above reduces the temperature rise in the non-sheet passing region when small sheets pass through the fixing device, which enhances the productivity, and utilizing the heat of the reflector 48 enables achieving energy saving. However, on the other hand, the reflector 48 contacting the heat conductor 45*a* causes a disadvantage that the heat of the fixing belt 42 escapes to the heat conductor 45*a* and the reflector 48 when temperatures of the reflector 48 and the heat conductor 45*a* are low, for example, during warming-up.

To countermeasure the disadvantage, the fixing device in the present embodiment includes a heat insulator that is a sheet (or a thin plate) containing silica aerogel between the reflector 48 and the heat conductor 45*a*.

Figure 4:
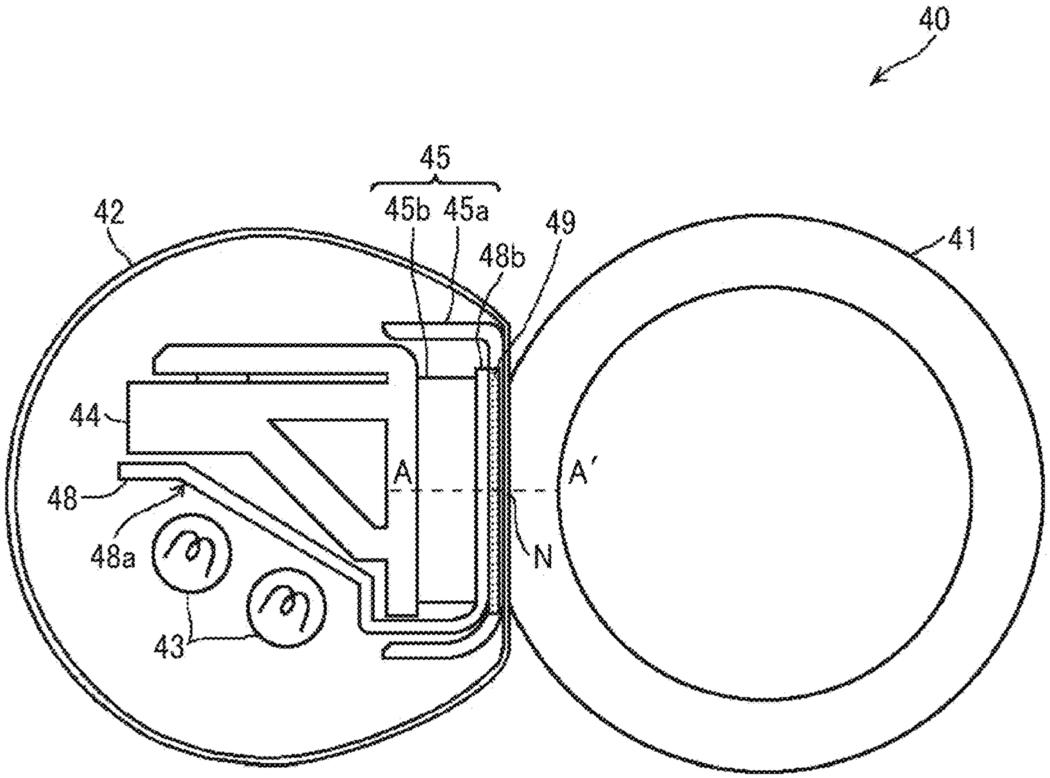
FIG. 4 is a schematic diagram illustrating a configuration of the fixing device of FIG. 2 further including a heat insulator.
Figure 5:
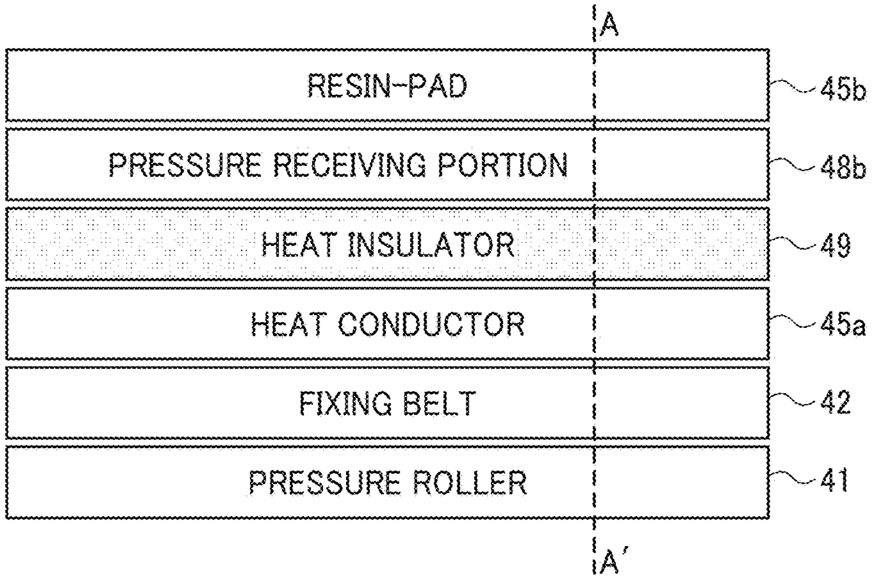
FIG. 5 is a schematic sectional view of a part of the fixing device of FIG. 4 taken along line A-A in FIG. 4.

FIG. 4 is a schematic diagram illustrating a configuration of the fixing device of FIG. 2 further including the heat insulator. FIG. 5 is a schematic sectional view taken along line A-A in FIG. 4.

The fixing device 40 illustrated in FIG. 4 includes a heat insulator 49 between the pressure-receiving portion 48*b* of the reflector 48 and the heat conductor 45*a*. The heat insulator 49 has a sheet shape (or thin plate shape) and contains silica aerogel as one of materials. In other words, the heat insulator 49 includes a sheet-shaped silica aerogel. As illustrated in FIG. 5, the heat conductor 45*a* and the pressure-receiving portion 48*b* are not in contact with each other.

The heat insulator 49 blocks the heat transfer from the fixing belt 42 to the pressure-receiving portion 48*b* of the reflector 48 through the heat conductor 45*a*, preventing the temperature rise of the fixing belt 42 from being delayed.

Figure 6:
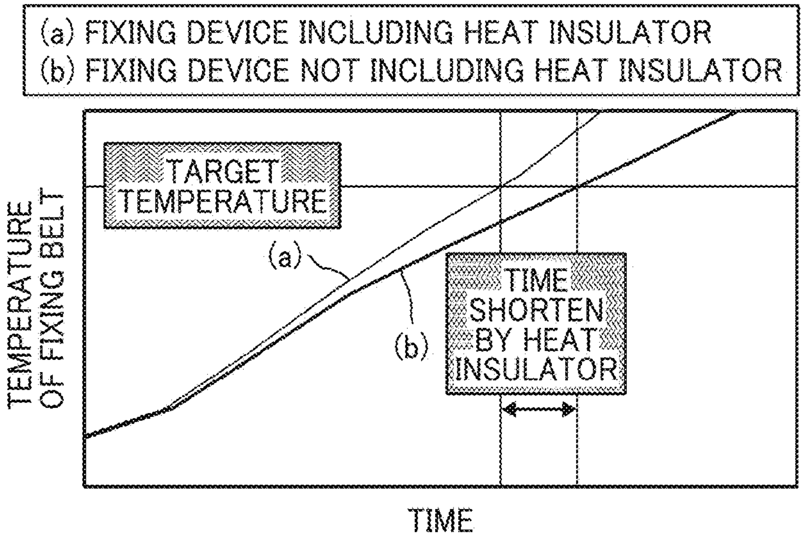
FIG. 6 is a graph illustrating a difference in temperature rise of a fixing belt depending on the presence or absence of a heat insulator.

FIG. 6 is a graph illustrating a difference in temperature rise of a fixing belt depending on the presence or absence of the heat insulator. In FIG. 6, the horizontal axis represents time (minutes), and the vertical axis represents temperature (° C.). The temperature rise of the fixing belt in the fixing device including the heat insulator is the line indicated by (a) in FIG. 6. The temperature rise of the fixing belt in the fixing device not including the heat insulator is the line indicated by (b) in FIG. 6. It is understood that the heat insulator set in the fixing device shortens the time that the temperature of the fixing belt reaches the target temperature.

The following describes the silica aerogel. Liquid crystal polymer has a thermal conductivity of 0.4 [W/m·K] and is used as a known material of heat insulator. However, even if the liquid crystal polymer is disposed between the heat conductor 45*a* and the pressure-receiving portion 48*b*, an amount of heat transferring from the heat conductor 45*a* to the pressure-receiving portion 48*b* is still large, and as a result, setting the liquid crystal polymer in the fixing device cannot sufficiently shorten the time that the temperature of the fixing belt 42 reaches the target temperature.

On the other hand, the silica aerogel has a thermal conductivity of 0.012 to 0.027 [W/m·K]. The silica aerogel has a high porosity and a low density that is typically about 0.06 to 0.2 [g/cm$^3$]. The ratio of a solid portion in the silica aerogel is small, and therefore, the conductive heat transfer through the silica skeleton is small. The mean pore diameter of the silica aerogel is about several ten nanometers that is below the mean free path of the main gas molecules in the air at around room temperature and atmospheric pressure, which prevents the convective heat transfer of the air.

Using the heat insulator having the thin plate shape and synthesized from the silica aerogel and fibers (or cellulose) enables sufficiently blocking heat escaping from the fixing belt 42 to the reflector 48 via the heat conductor 45*a* and, as a result, accelerating the temperature rise of the fixing belt 42.

The fiber of the heat insulator is preferably a heat-resistant material such as polyphenylene sulfide (PPS) or aramid. The heat insulator may be a rigid body.

A description is given below of an advantageous configuration of the heat insulator.

Figure 7:
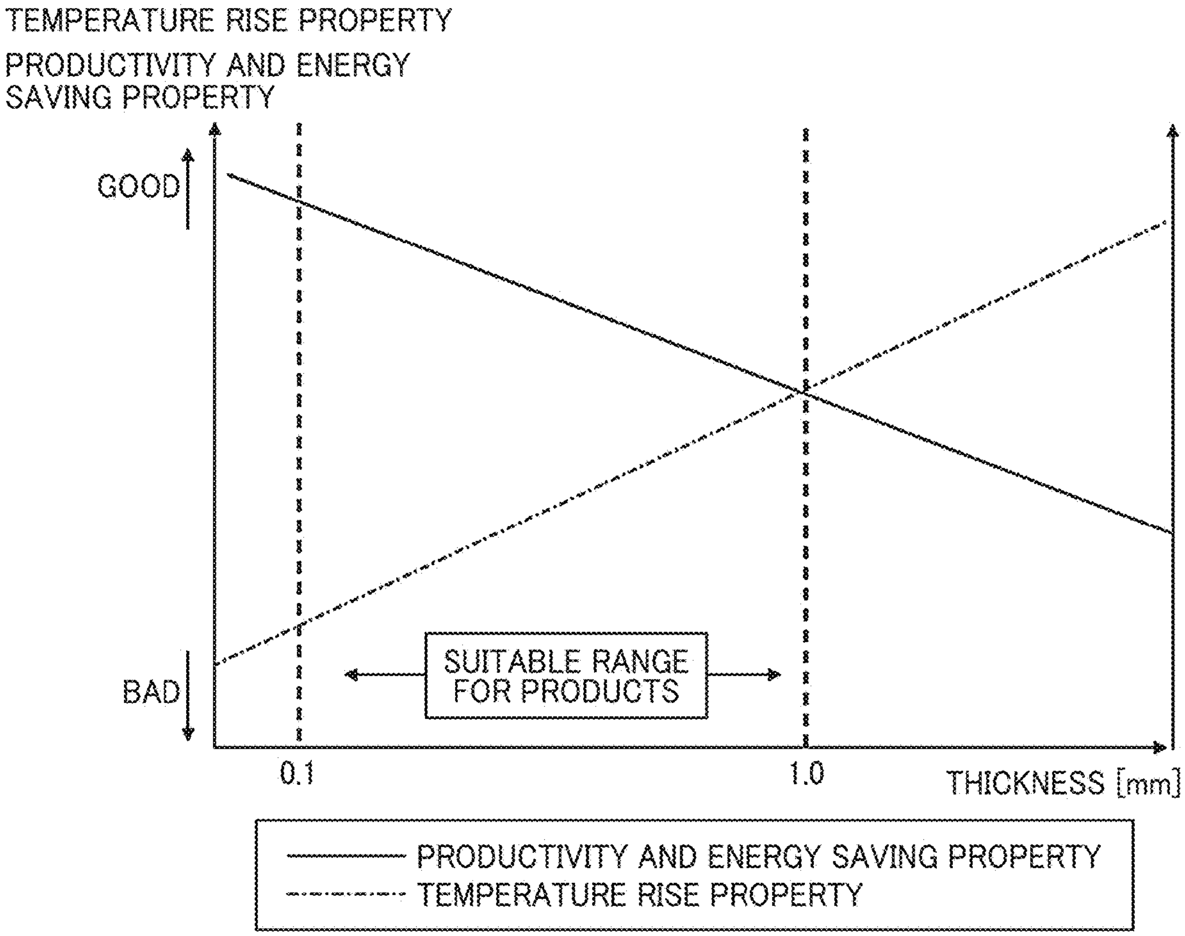
FIG. 7 is a graph illustrating a relationship between (a) temperature rise property and (b) productivity and energy saving property with respect to the thickness of a heat insulator. The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

FIG. 7 is a graph illustrating a relationship between (a) temperature rise property and (b) productivity and energy saving property with respect to the thickness of the heat insulator. In FIG. 7, the horizontal axis represents the thickness (mm) of the heat insulator, and the vertical axis represents the degree of (a) the temperature rise property and (b) the productivity and the energy saving property.

The larger the thickness of the heat insulator 49, the smaller the amount of heat transferring (escaping) from the fixing belt 42 to the heat conductor 45*a* and the pressure-receiving portion 48*b* that contacts the heat conductor 45*a*. As a result, the temperature rise of the fixing belt 42 is accelerated. However, on the other hand, increasing the thickness of the heat insulator 49 reduces the heat equalizing effect of the heat conductor 45*a* and the pressure-receiving portion 48*b*, and therefore, the productivity of printing small recording media is reduced.

In addition, increasing the thickness of the heat insulator 49 reduces an amount of heat transferring from the reflector 48 to the fixing belt 42 via the heat conductor 45*a* in the above-described configuration, which reduces the energy saving performance. The temperature rise property and the productivity and energy saving property with respect to the thickness of the heat insulator 49 are in a trade-off relationship.

The thickness of the heat insulator 49 is preferably in a range of 0.1 mm to 1.0 mm so that the temperature rise property, the productivity, and the energy saving property are suitable values for products.

The thickness of the heat insulator 49 may be adjusted to provide a superior temperature rise property (or a superior productivity and energy saving property) depending on the use of the product.

The embodiments of the present disclosure have been described in detail above. The above-described embodiments are examples and can be modified within the scope not departing from the gist of the present disclosure. For example, any embodiment and any modification may be combined.

The effects obtained by the above-described embodiment are examples. The effects according to the present disclosure are not limited to the above-described effects.

Aspects of the present disclosure are, for example, as follows.

(First Aspect)

In a first aspect, a fixing device includes a fixing rotator, a heat conductor, a pressure rotator, a heater, a pressure-receiving portion, and a heat insulator. The heat conductor contacts an inner circumferential surface of the fixing rotator to uniform temperature distribution in a rotation axis direction of the fixing rotator. The pressure rotator presses the fixing rotator against the heat conductor to form a nip and presses a recording medium passing through the nip. The heater is disposed inside a loop of the fixing rotator. The pressure-receiving portion contacts the heat conductor to receive pressure from the pressure rotator via the fixing rotator. The heat insulator is between the pressure-receiving portion and the heat conductor and includes a sheet-shaped silica aerogel.

(Second Aspect)

In a second aspect, the fixing device according to the first aspect further includes a reflector including a reflecting portion to reflect radiant heat radiated by the heater toward an inner circumferential surface of the fixing rotator, and the pressure-receiving portion connected to the reflecting portion to transfer heat from the reflecting portion to the pressure-receiving portion.

(Third Aspect)

In a third aspect, a thermal conductivity of the heat insulator in the fixing device according to the first aspect or the second aspect is in a range from 0.012 to 0.027 W/m·K.

(Fourth Aspect)

In a forth aspect, a thickness of the heat insulator in the fixing device according to any one of the first to third aspects is in a range from 0.1 to 1.0 mm.

(Fifth Aspect)

In a fifth aspect, an image forming apparatus includes the fixing device according to any one of the first to fourth aspects.

(Sixth Aspect)

In a sixth aspect, the sheet-shaped silica aerogel in the fixing device according to any one of the first to fourth aspects includes a sheet synthesized from silica aerogel and fibers.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:
- a fixing rotator;
- a heat conductor contacting an inner circumferential surface of the fixing rotator to equalize temperature distribution in a rotation axis direction of the fixing rotator;
- a pressure rotator to press the fixing rotator against the heat conductor to form a nip and press a recording medium passing through the nip;
- a heater disposed inside a loop of the fixing rotator;
- a reflector including:
- a reflecting portion to reflect radiant heat radiated by the heater toward an inner circumferential surface of the fixing rotator; and
- a pressure-receiving portion receiving pressure from the pressure rotator via the fixing rotator, the pressure-receiving portion being connected to the reflecting portion to transfer heat from the reflecting portion to the pressure-receiving portion; and
- a heat insulator between the pressure-receiving portion of the reflector and the heat conductor so as to prevent any direct contact between the heat conductor and the pressure-receiving portion, the heat insulator including a sheet-shaped silica aerogel.

2. The fixing device according to claim 1,
wherein a thermal conductivity of the heat insulator is in a range from 0.012 to 0.027 W/m·K.

3. The fixing device according to claim 1,
wherein a thickness of the heat insulator is in a range from 0.1 to 1.0 mm.

4. An image forming apparatus comprising the fixing device according to claim 1.

5. The fixing device according to claim 1,
wherein the sheet-shaped silica aerogel includes a sheet synthesized from silica aerogel and fibers.

6. The fixing device according to claim 1, wherein the heat conductor includes a coating, and
the coating of the heat conductor includes a resin.

7. The fixing device according to claim 6, wherein the coating of the heat conductor further includes glass fiber, carbon, graphite, graphite fluoride, carbon fiber, molybdenum disulfide, or fluororesin.

8. The fixing device according to claim 1, wherein the heat conductor has a thermal conductivity of 50 W/m·K or more.

9. The fixing device according to claim 8, wherein the heat conductor is made of aluminum or copper.

10. The fixing device according to claim 9, wherein the heat conductor further includes a coating, and
the coating of the heat conductor includes:
- a resin; and
- glass fiber, carbon, graphite, graphite fluoride, carbon fiber, molybdenum disulfide, or fluororesin.

11. The fixing device according to claim 1, wherein the heat conductor has a pad shape extending in a width direction of the fixing rotator.

12. The fixing device according to claim 1, further comprising a stay disposed inside the loop of the fixing rotator,
wherein the heat conductor is held by the stay.

13. The fixing device according to claim 12, further comprising a resin-pad between the pressure-receiving portion of the reflector and the stay, wherein the heat insulator is between the pressure-receiving portion of the reflector and the heat conductor, and the resin-pad supports the heat conductor from a side opposite the fixing rotator.

14. The fixing device according to claim 1, wherein the reflector is made of aluminum.

15. The fixing device according to claim 14, wherein the reflector has a reflectance of 95% or more.

16. The fixing device according to claim 1, wherein the heater is a halogen heater.

17. The fixing device according to claim 1, comprising two of the heaters disposed inside the loop of the fixing rotator.

18. The fixing device according to claim 1, wherein the pressure rotator is a hollow roller.

19. The fixing device according to claim 18, wherein the heat-resistant material is polyphenylene sulfide or aramid.

20. The fixing device according to claim 1, wherein the heat insulator includes fibers made of a heat-resistant material.

* * * * *